(12) United States Patent
Gillham et al.

(10) Patent No.: US 8,542,413 B2
(45) Date of Patent: Sep. 24, 2013

(54) LASER SCANNER ASSEMBLY

(75) Inventors: Jason Gregory Gillham, Kitchener (CA); Tomasz Ciochon, Kitchener (CA)

(73) Assignee: 2G Robotics Inc., Waterloo, Ontario ( * ) Notice: Subject to any disclaimer, the term of this patent is extended or adjusted under 35 U.S.C. 154(b) by 118 days.

(21) Appl. No.: 13/202,405

(22) PCT Filed: Feb. 22, 2010

(86) PCT No.: PCT/CA2010/000241
§ 371 (c)(1),
(2), (4) Date: Nov. 30, 2011

(87) PCT Pub. No.: WO2010/094135
PCT Pub. Date: Aug. 26, 2010

(65) Prior Publication Data
US 2012/0062963 A1 Mar. 15, 2012

Related U.S. Application Data

(60) Provisional application No. 61/154,680, filed on Feb. 23, 2009, provisional application No. 61/156,975, filed on Mar. 3, 2009.

(51) Int. Cl.
*H04N 1/04* (2006.01)

(52) U.S. Cl.
USPC ........... 358/474; 358/497; 358/475; 382/154; 356/4.01; 348/81

(58) Field of Classification Search
USPC ................ 358/474, 475, 483, 482, 497, 496; 382/154, 254; 356/4.01, 141.1, 5.01, 502; 348/81, 373, 376
See application file for complete search history.

(56) References Cited

U.S. PATENT DOCUMENTS

| 4,035,816 | A | 7/1977 | Winnacker |
| 4,153,357 | A | 5/1979 | Winnacker et al. |
| 4,485,398 | A | 11/1984 | Chapin, Jr. et al. |
| 4,860,038 | A | 8/1989 | Thatcher et al. |
| 5,146,287 | A | 9/1992 | Carder |
| 5,239,324 | A | 8/1993 | Ohmura et al. |

(Continued)

FOREIGN PATENT DOCUMENTS

CA 2404976 11/2001

OTHER PUBLICATIONS

Favre-Bulle, et al., Efficient Tracking of 3D-Robot Positions by Dynamic Triangulation. IEEE Instrumentation and Measurement Technology Conference, May 18-21, 1998, pp. 446-449.

*Primary Examiner* — Negussie Worku

(57) ABSTRACT

A laser scanner assembly for obtaining data to generate one or more three-dimensional clouds of data describing one or more submerged surfaces. The laser scanner assembly includes a housing subassembly with one or more body elements defining one or more cavities therein and comprising at least one window element therein at least partially defining the cavity, a light-generating subassembly positioned in the cavity having a laser source for generating laser light and a means for configuring the laser light into a fan configuration, and one or more optical sensors positioned in the cavity. The laser scanner assembly also includes means for moving the light-generating subassembly relative to the submerged surface, for illuminating illuminated points respectively, and means for determining the data for locating each illuminated point respectively utilizable for generating the three-dimensional cloud of data by using a baseline distance and first and second angles for each illuminated point respectively.

16 Claims, 19 Drawing Sheets

(56) References Cited

U.S. PATENT DOCUMENTS

| | | | |
|---|---|---|---|
| 5,325,139 A | 6/1994 | Matsumoto | |
| 5,669,020 A | 9/1997 | Hopmeyer | |
| 5,696,577 A | 12/1997 | Stettner et al. | |
| 5,896,190 A * | 4/1999 | Wangler et al. | 356/4.01 |
| 6,064,824 A | 5/2000 | Rink | |
| 6,115,511 A | 9/2000 | Sakai et al. | |
| 6,262,761 B1 | 7/2001 | Zernov et al. | |
| 6,302,355 B1 | 10/2001 | Sallee et al. | |
| 6,380,871 B1 | 4/2002 | Kaplan | |
| 6,600,553 B1 * | 7/2003 | Stone | 356/4.01 |
| 6,781,683 B2 * | 8/2004 | Kacyra et al. | 356/141.1 |
| 7,058,213 B2 * | 6/2006 | Rubbert et al. | 382/128 |
| 7,117,116 B2 * | 10/2006 | Chang et al. | 702/153 |
| 7,215,430 B2 * | 5/2007 | Kacyra et al. | 356/601 |
| 7,259,864 B1 | 8/2007 | Antonelli et al. | |
| 7,266,445 B1 | 9/2007 | Janky et al. | |
| 7,313,506 B2 * | 12/2007 | Kacyra et al. | 703/6 |
| 7,507,940 B2 | 3/2009 | Fournier et al. | |
| 7,583,365 B2 * | 9/2009 | Lepere et al. | 356/4.01 |
| 7,613,075 B2 | 11/2009 | Cray et al. | |
| 8,017,928 B2 * | 9/2011 | McStay et al. | 250/559.4 |
| 8,050,863 B2 * | 11/2011 | Trepagnier et al. | 701/514 |
| 8,244,332 B2 * | 8/2012 | Azar et al. | 600/476 |
| 8,351,025 B2 * | 1/2013 | Ootani et al. | 356/3.01 |
| 2002/0001463 A1 | 1/2002 | Inoue et al. | |
| 2008/0008031 A1 | 1/2008 | Vigen et al. | |
| 2008/0218821 A1 | 9/2008 | Dalgleish et al. | |

\* cited by examiner

LASER SCANNER ASSEMBLY

FIELD OF THE INVENTION

The present invention is a laser scanner assembly for obtaining data to generate three-dimensional point clouds of data describing one or more submerged surfaces.

BACKGROUND OF THE INVENTION

Conventional techniques for obtaining information about submerged features of objects (e.g., underwater pipes), such as techniques using acoustic sensors, are generally not capable of measuring relatively fine details, e.g., cracks. Because such details can be critical, however, attempts have been made to obtain more precise information about submerged surfaces of objects using laser scanning.

Conventional underwater laser measurement devices are known. However, such devices typically are only adapted to obtain two-dimensional point clouds of data, with the device remaining stationary. In order for the conventional measurement device to obtain three-dimensional data, the device is required to be moved from one known location to another known location.

Various types of underwater laser scanners have been described. For example, in "A Practical Underwater 3D-Laserscanner" (Hildebrandt et al., IEEE, 2008), a calibration system for a triangulation-based laser scanner is disclosed. In Hildebrandt et al., it is proposed that a laser scanner device (i.e., including a laser and a camera) may conveniently be assembled by mounting a laser on an underwater vehicle, where the vehicle includes a suitable underwater camera. After the laser is mounted on a vehicle to which a suitable camera has also been attached, a calibration procedure is followed, to ensure that the data provided by the laser scanner device provides accurate data. The calibration appears to be done in situ, which tends to be time-consuming and therefore costly. Also, the calibration in situ is required to be done repeatedly, i.e., every time that the prior art laser scanner device is mounted onto a different underwater vehicle.

SUMMARY OF THE INVENTION

There is therefore a need for an improved laser scanner assembly for scanning submerged surfaces which addresses or mitigates one or more of the disadvantages of the prior art. The laser scanner assembly of the invention is a robust, commercially viable device which is not required to be re-calibrated when moved from one vehicle to another.

In its broad aspect, the invention includes a laser scanner assembly for obtaining data to generate one or more three-dimensional clouds of data describing one or more submerged surfaces. The laser scanner assembly includes a housing subassembly having one or more body elements defining one or more cavities therein with one or more window elements therein at least partially defining the cavity, a light-generating subassembly positioned in the cavity including a laser source for generating laser light and a means for configuring the laser light into a fan configuration, and one or more optical sensors positioned in the cavity. The means for configuring the laser light into the fan configuration and each optical sensor are spaced apart by a predetermined baseline distance defining a substantially straight baseline therebetween. The laser light fan configuration is transmittable through the window element toward the submerged surface, to illuminate a plurality of selected points thereon successively. The laser scanner assembly also includes means for moving the light-generating subassembly relative to the submerged surface, for illuminating the illuminated points on the submerged surface respectively. The laser light fan configuration is directed through the window element to each illuminated point respectively at a first angle relative to the baseline for each illuminated point respectively. Each illuminated point is respectively detectable through the window element by the optical sensor, each illuminated point and the optical sensor defining a reflection path therebetween respectively, the reflection path and the baseline defining a second angle therebetween for each illuminated point respectively. The laser scanner assembly also includes means for determining the data for locating each illuminated point respectively utilizable for generating the three-dimensional cloud of data by using the baseline distance and the first and second angles for each illuminated point respectively.

In another aspect, the laser scanner assembly also includes means for transmitting the data to a means for generating the three-dimensional cloud of data.

In another aspect, the light-generating subassembly is at least partially movable relative to each optical sensor.

The invention also provides a laser scanner system for providing one or more three-dimensional clouds of data describing one or more submerged surfaces. The system includes one or more laser scanner assemblies. The laser scanner assembly includes a housing subassembly having one or more body elements defining one or more cavities therein with one or more window elements therein at least partially defining the cavity, a light-generating subassembly positioned in the cavity including a laser source for generating laser light and a means for configuring the laser light into a fan configuration, and one or more optical sensors positioned in the cavity. The means for configuring the laser light into the fan configuration and each optical sensor are spaced apart by a predetermined baseline distance defining a substantially straight baseline therebetween. The laser light fan configuration is transmittable through the window element toward the submerged surface, to illuminate a plurality of selected points thereon successively. The laser scanner assembly also includes means for moving the light-generating subassembly relative to the submerged surface, for illuminating the illuminated points on the submerged surface respectively. The laser light fan configuration is directed through the window element to each illuminated point respectively at a first angle relative to the baseline for each illuminated point respectively. Each illuminated point is respectively detectable through the window element by the optical sensor, each illuminated point and the optical sensor defining a reflection path therebetween respectively, the reflection path and the baseline defining a second angle therebetween for each illuminated point respectively. The laser scanner assembly also includes means for determining the data for locating each illuminated point respectively utilizable for generating the three-dimensional cloud of data by using the baseline distance and the first and second angles for each illuminated point respectively. The laser scanner system also includes means for receiving the transmitted data, and means for utilizing the data to generate the three-dimensional cloud of data describing the submerged surface.

In addition, the invention provides a method of providing one or more three-dimensional clouds of data describing one or more submerged surfaces. The method includes, first, the step of providing the laser scanner assembly of the invention. Next, the laser light configuration is transmitted through the window element toward the submerged surface, to illuminate a plurality of selected points thereon successively. The light-generating subassembly is moved relative to the submerged surface, for illuminating the illuminated points on the submerged surface respectively. The laser light fan configuration is directed toward the submerged surface at a first angle relative to the baseline for each illuminated point respectively. The optical sensor is utilized to detect each illuminated point respectively, each illuminated point and the optical sensor defining a reflection path therebetween, the reflection path and the baseline defining a second angle therebetween for each illuminated point respectively. Data locating each illuminated point respectively is determined, for generating the three-dimensional cloud of data by triangulation using the baseline distance and the first and second angles for each illuminated point respectively. Next, the data is transmitted to means for generating one or more three-dimensional clouds of data describing the submerged surface based on the data. The three-dimensional cloud of data, describing the submerged surface based on the data, is then generated.

BRIEF DESCRIPTION OF THE DRAWINGS

The invention will be better understood with reference to the attached drawings, in which.

DETAILED DESCRIPTION

Figure 1:
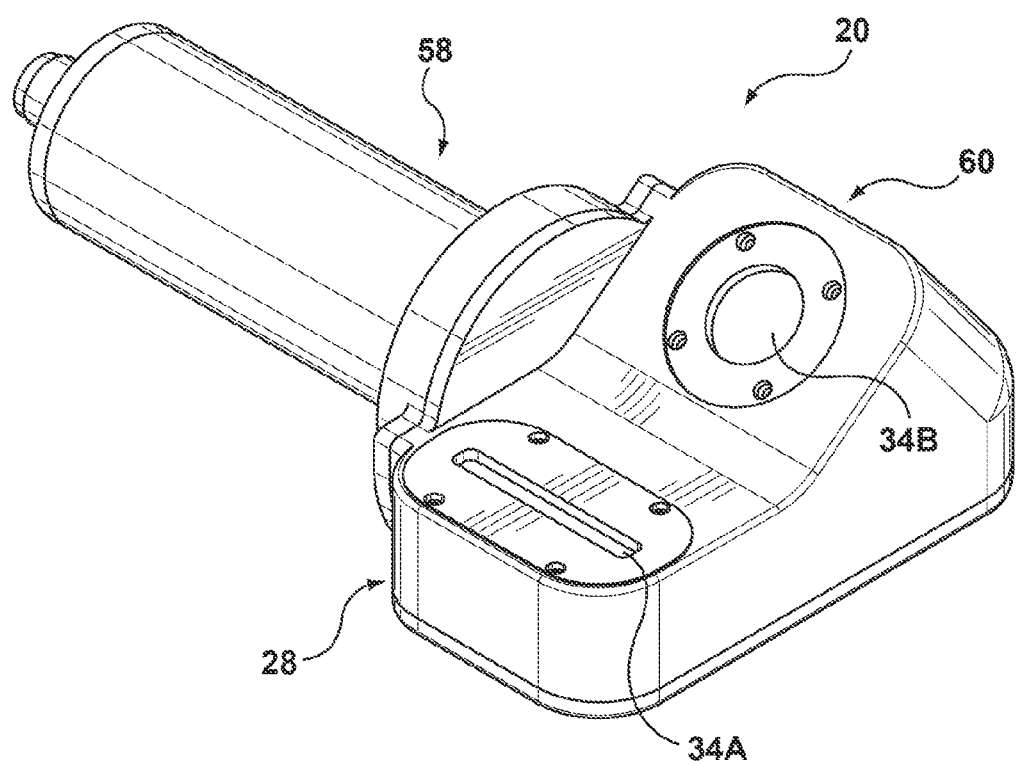
FIG. 1 is an isometric view of an embodiment of the laser scanner assembly of the invention.
Figure 2:
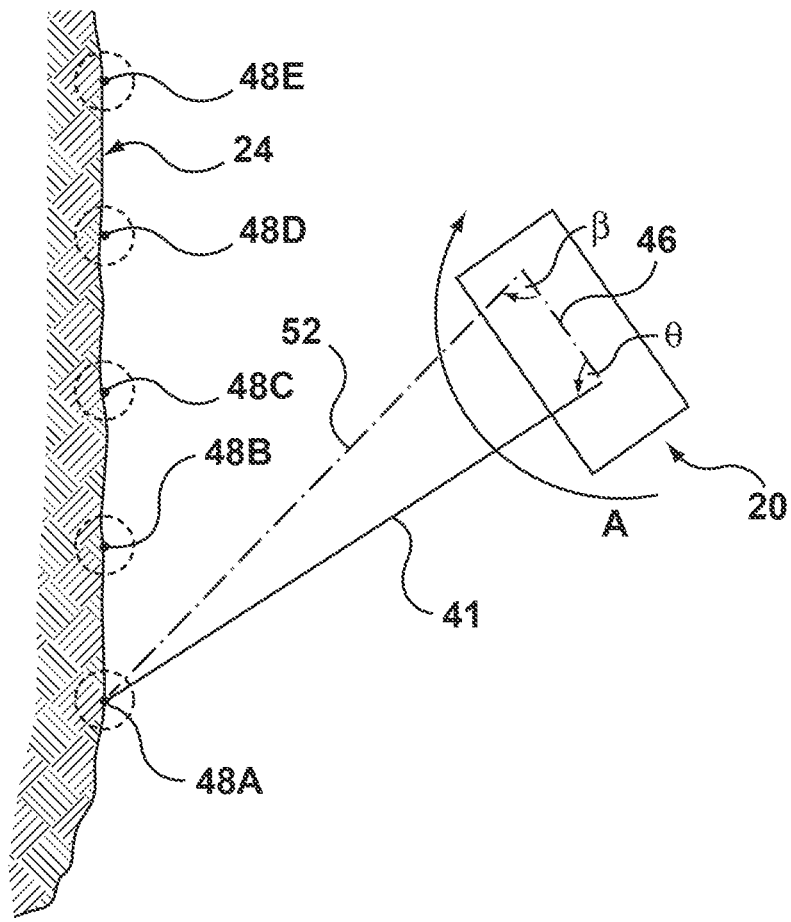
FIG. 2 is a schematic diagram of the laser scanner of FIG. 1 in relation to a submerged surface.
Figure 4:
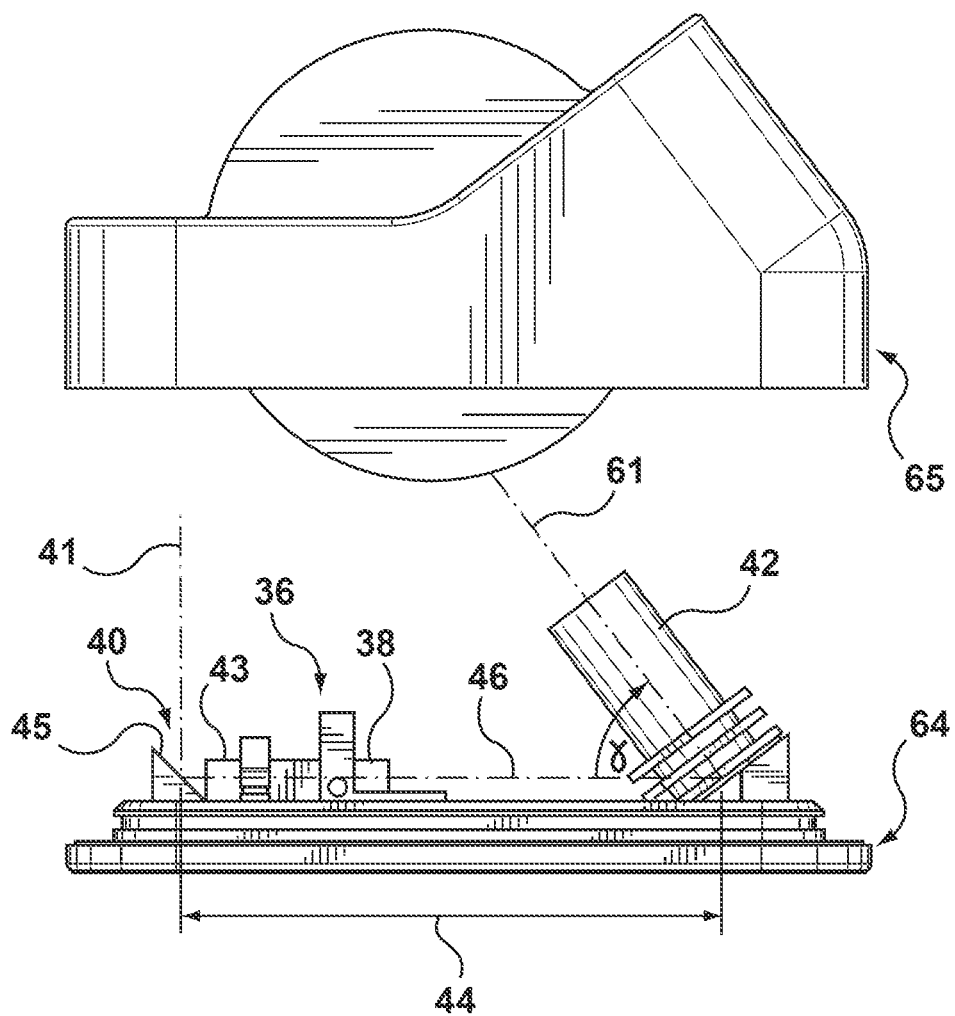
FIG. 4 is an exploded end view of the laser scanner assembly of FIG. 1.
Figure 5:
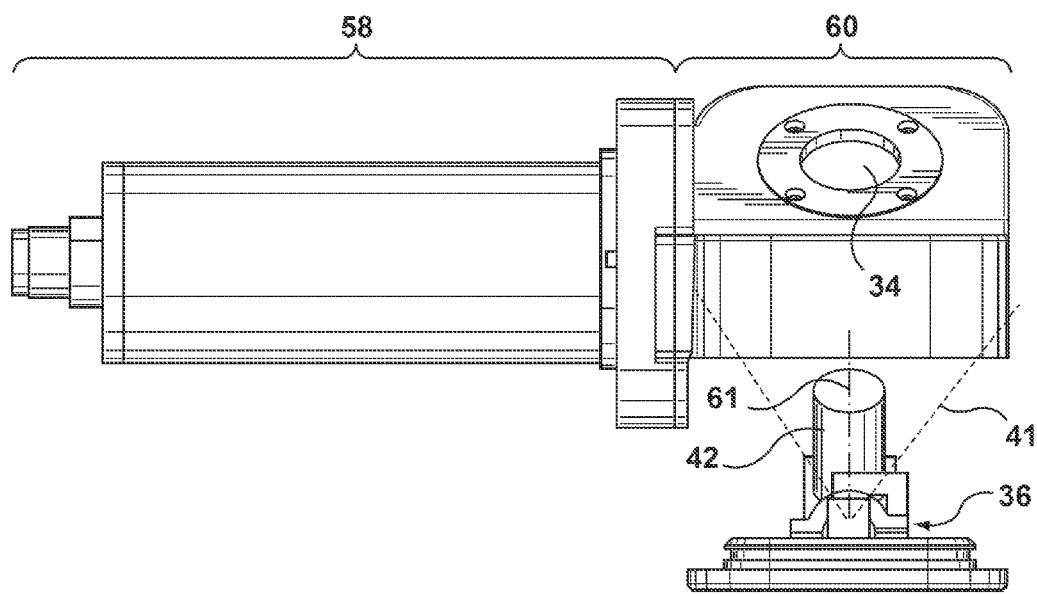
FIG. 5 is an exploded side view of the head portion of the laser scanner assembly of FIG. 1.

In the attached drawings, like reference numerals designate corresponding elements throughout. Reference is first made to FIGS. 1-10A to describe an embodiment of the laser scanner assembly 20 of the invention. The laser scanner assembly 20 is for obtaining data 22 to generate one or more three-dimensional point clouds of data 23 (FIG. 10A) of one or more submerged surfaces 24 (FIG. 2). In one embodiment, the laser scanner assembly 20 preferably includes a housing subassembly 28 having one or more body elements 30 defining one or more cavities 32 therein. As can be seen in FIG. 1, the housing subassembly 28 preferably includes one or more window elements 34 also at least partially defining the cavity 32. Preferably, the laser scanner assembly 20 also includes a light-generating subassembly 36 positioned in the cavity 32 having a laser source 38 for generating laser light (FIG. 3), and means 40 for shaping the laser light into a fan configuration 41 (FIG. 5). In addition, and as shown in FIGS. 3-5 and 6B, the laser scanner assembly 20 also includes one or more optical sensors 42 positioned in the cavity 32. The laser source 38 and the optical sensor 42 are spaced apart by a predetermined baseline distance 44 defining a substantially straight baseline 46 between the means 40 and the optical sensor 42, as will also be described (FIG. 4). Preferably, the laser light fan configuration 41 is transmittable through the window element 34 toward the submerged surface 24, to illuminate a number of selected points 48 thereon successively (FIG. 2). The assembly 20 preferably also includes means 50 (FIG. 6B) for moving the light-generating subassembly 36 relative to the submerged surface 24, for illuminating the illuminated points 48 on the submerged surface 24 respectively. The laser light configuration 41 is directed through the window element 34 to each illuminated point 48 respectively at a first angle θ relative to the baseline 46 for each illuminated point 48 respectively (FIG. 2). Each illuminated point 48 is respectively detectable through the window element 34 by the optical sensor 42, and each illuminated point 48 and the optical sensor 42 defining a straight reflection path 52 therebetween respectively. It is preferred that the reflection path 52 and the baseline 46 define a second angle β therebetween for each illuminated point 48 respectively (FIG. 2). Preferably, the assembly 20 also includes means 54 (FIG. 10A) for determining the data 22 for locating each illuminated point 48 respectively utilizable for generating the three-dimensional point clouds of data 23 by using the baseline distance 44 and the first and second angles θ, β for each illuminated point 48 respectively.

Figures 10A, 10B:
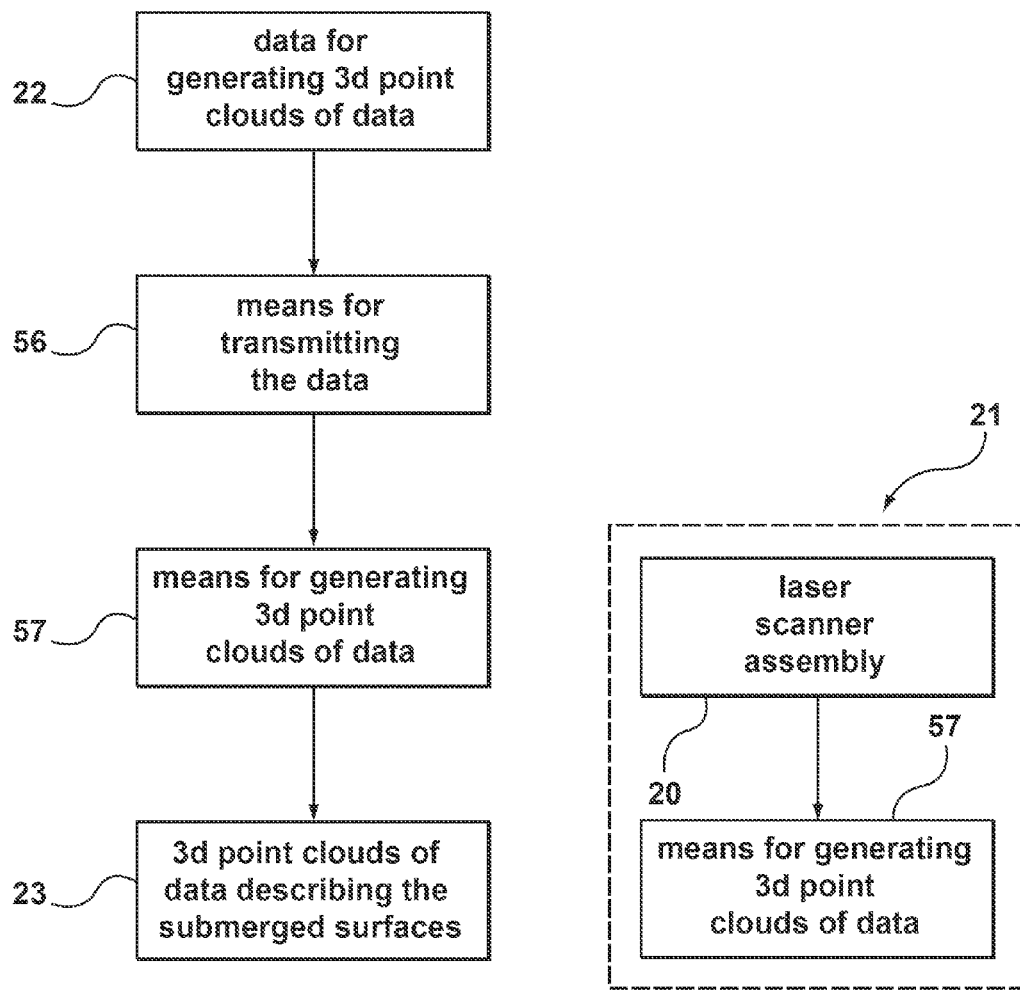
FIG. 10A is a block diagram schematically representing an embodiment of a process of the invention.
FIG. 10B is a block diagram schematically representing an embodiment of a system of the invention.
Figure 11:
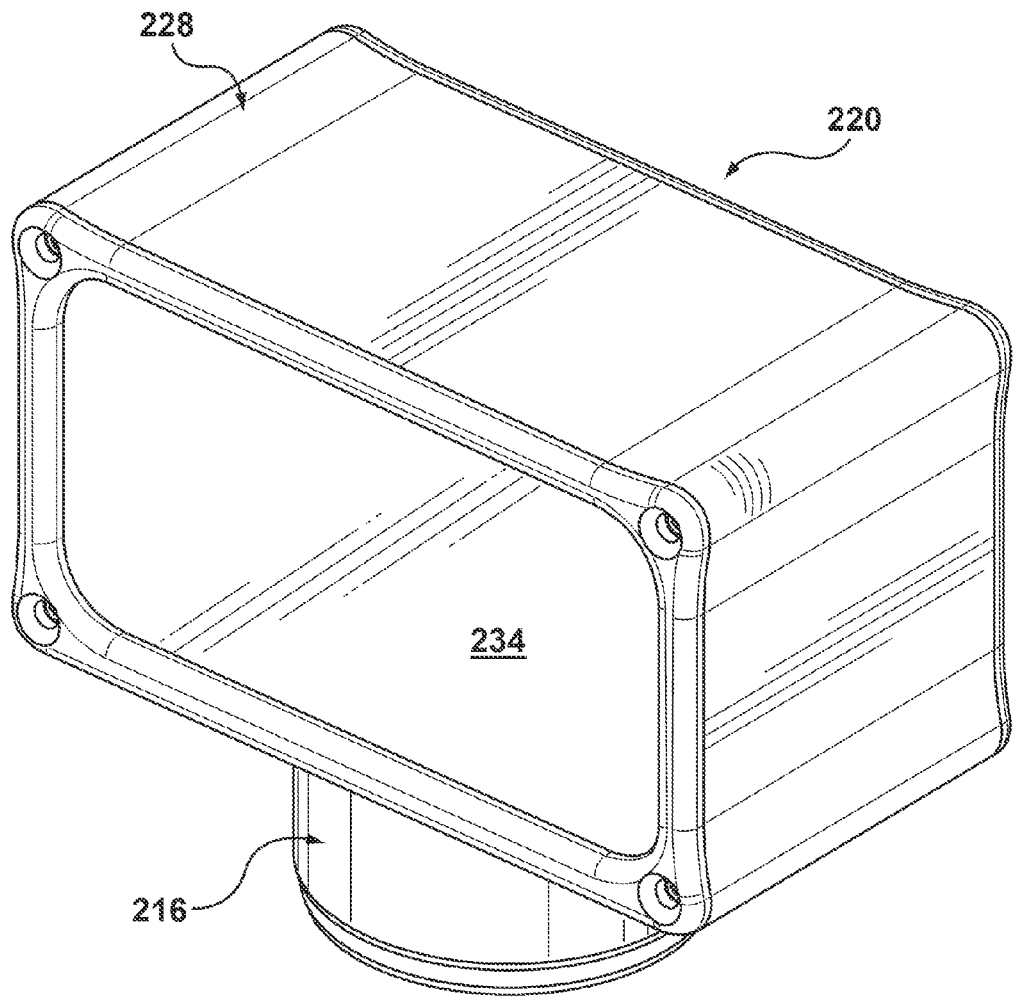
FIG. 11 is an isometric view of an alternative embodiment of the laser scanner assembly of the invention, drawn at a larger scale.

The assembly 20 preferably also includes means 56 for transmitting the data 22 to means 57 for generating the three-dimensional point clouds of data 23 (FIG. 10A).

In one embodiment of the laser scanner assembly 20, the means 40 preferably includes a lens 43 and a mirror 45. Those skilled in the art would be aware of the details of the lens which is required to configure the laser light into the fan configuration, and it is therefore not necessary to provide such details. The mirror 45 preferably is a substantially flat reflective surface which reflects the laser light as shown in FIG. 4, i.e., to provide a planar sheet of laser light in the fan configuration. The optical sensor 42 preferably consists of a suitable optical sensor lens and a suitable CCD (charge-coupled device). It is not necessary to provide further details about the optical sensor lens because those skilled in the art would be aware of such details.

The three-dimensional point clouds of data may be used in various ways to enable the user to analyze the submerged surface which is examined. For example, using techniques familiar to those skilled in the art, the data may be plotted to provide a three-dimensional model of the submerged surface. Because the data provides three-dimensional information about the submerged surface, the viewer can determine the relative positions of various features within the scan. For example, if a crack is scanned, the three-dimensional cloud of data enables the viewer to measure the width and depth of the crack.

Figure 3:
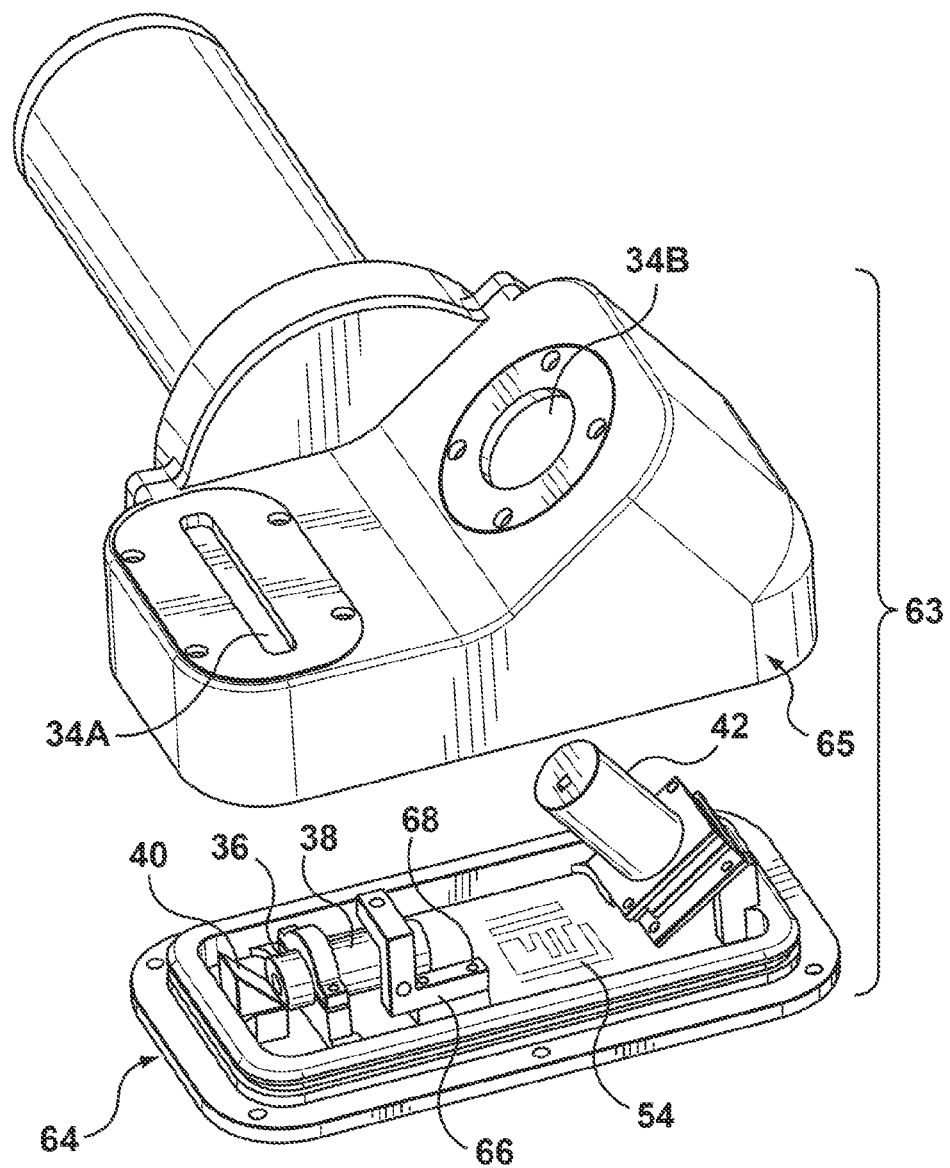
FIG. 3 is an exploded isometric view of the laser scanner assembly of FIG. 1.

As can be seen in FIGS. 1 and 3, in one embodiment, the laser scanner assembly 20 preferably includes a laser window element (identified as 34A in FIGS. 1 and 3) through which the laser light fan configuration 41 is transmitted to the illuminated points 48 respectively and an optical sensor window element (identified as 34B in FIGS. 1 and 3) through which the optical sensor 42 detects the illuminated points respectively.

In one embodiment, the housing subassembly 28 preferably includes a body portion 58 and a head portion 60 mounted to the body portion 58 (FIGS. 1, 5). The head portion 60 is movable relative to the body portion 58, as will be described. Preferably, the means 50 in this embodiment includes a means for moving the head portion 60 relative to the body portion 58. The light-generating subassembly 36 and the optical sensor 42 preferably are mounted in the head portion 60, and movement of the head portion 60 relative to the body portion 58 results in movement of the light-generating subassembly 36 and the optical sensor 42 relative to the submerged surface.

Industrial Applicability

Figure 17:
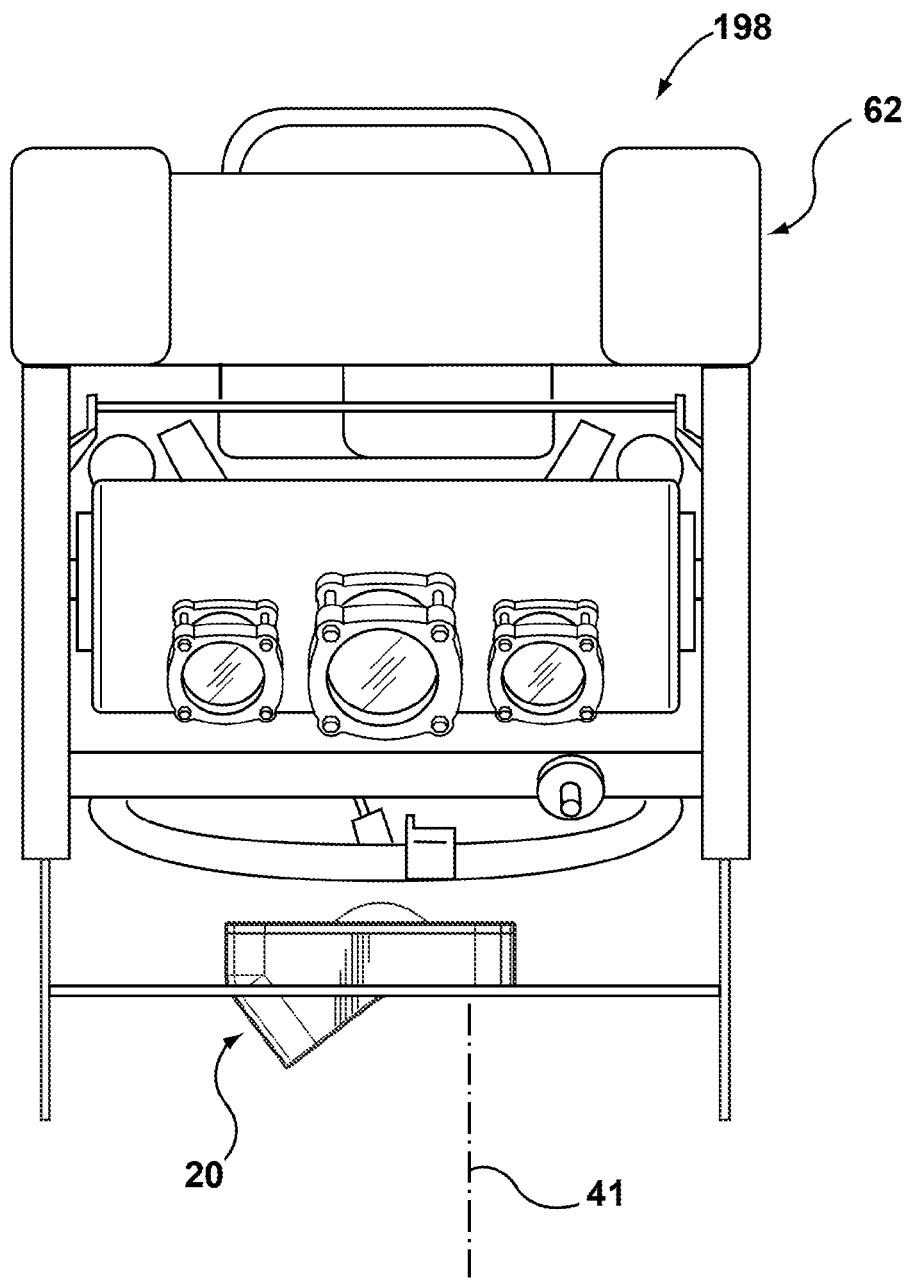
FIG. 17 is a front view of an embodiment of an underwater vehicle of the invention, drawn at a smaller scale.

In use, the laser scanner assembly 20 preferably is mounted on a vehicle 62 (FIG. 17). The laser scanner assembly 20 may be mounted on any suitable vehicle adapted for operation underwater, e.g., an underwater remotely operated vehicle (ROV). As described above, the laser fan configuration 41 is directed to a number of points 48 on the submerged surface 24. For illustrative purposes, points 48A-48E are identified in FIG. 2.

In one embodiment, the angle θ between the means 40 and the baseline 46 is determined when the laser scanner assembly 20 is calibrated. Preferably, an angle γ (FIG. 4) defined between a principal direction 61 (FIG. 5) of the optical sensor 42 and the baseline 46 is also determined in calibration. The principal direction 61 is a principal axis of the optical sensor 42 defining the center line of the optical sensor 42. The principal direction is used because the reflection path 52 is determinable relative to the principal direction. If γ (i.e., the position of the principal direction relative to the baseline) is known with sufficient accuracy, then it is possible to determine β, with the desired accuracy.

The calibration preferably is done when the laser scanner assembly is manufactured, e.g., at the factory. Accordingly, the calibration preferably is done under controlled conditions, and not underwater, in which the desired accuracy is achievable. This is in contrast to the calibration of the prior art devices, which is done in situ, and is required to be done when the prior art device is mounted on a new vehicle. Because calibration of the prior art devices is done in situ, the mobilization/installation time for these devices is greater. Accordingly, more accurate calibration is generally achievable with the laser scanner assembly 20 of the invention, and this ultimately results in more accurate data, and more accurate three-dimensional point clouds of data generated therefrom. Another advantage of the laser scanner assembly of the invention is that it generally is required to be calibrated only once, i.e., shortly after its manufacture, and before shipment from the factory.

As an example, when the laser fan configuration 41 is directed at point 48A, the laser light which is directed to the point 48A is detected by the optical sensor 42. The reflection path 52 is determined by the optical sensor 42 detecting the light at the point 48A. Using triangulation, the data 22 locating the point 48A relative to the laser scanner assembly 20 is generated by the control circuit 54. The process is repeated for the balance of points, represented schematically as points 48B-48E in FIG. 2 for illustrative purposes.

It will be understood by those skilled in the art that the information for many points illuminated by the laser fan configuration (e.g., hundreds) is rapidly obtained. For example, when the laser scanner assembly is positioned as shown in FIG. 2, it obtains data for hundreds of points on the line on which point 48A is located. The head portion 60 moves (i.e., in the direction indicated by arrow "A" in FIG. 2) so that point 48B and hundreds of points on the line defined by the fan configuration when it is on point 48B are then captured. The process is repeated for other points, e.g., 48C-48E. Those skilled in the art will appreciate that the data is rapidly obtained, e.g., data is obtained for thousands of points per second. Once sufficient data is generated to permit generation of a three-dimensional point cloud of data, the data is transmitted to a means for generating the three-dimensional point cloud of data.

Those skilled in the art will appreciate that a number of devices would be suitable optical sensors. Preferably, the optical sensor is a charge-coupled device (CCD) having suitable characteristics, programmed to detect a number of points along the intersection of the laser fan configuration with the submerged surface. It is preferred that the optical sensor 42 is a 2D CCD with a M12 lens. For example, cameras nos. 20K14XUSB-C and 21K14XUSB-C, including a 0.25 inch IL CCD (available from Videology Imaging Solutions Inc.), have been found to be suitable.

It will also be appreciated by those skilled in the art that a variety of lasers and means for configuring the laser light generated thereby into fan configurations may be suitable. For example, a 532 nm DPSS green laser module provided by Apinex is suitable. The power output is 5 milliwatts. The means 40 preferably is a right-angle mirror which configures the laser light into the laser fan configuration 41 and directs the laser light fan configuration 41 through the window element 34A toward the submerged surface 24.

As can be seen in FIG. 3, the light-generating subassembly 36 and the optical sensor 42 preferably are mounted to a back plate 64 which forms part of the housing subassembly 28. The back plate 64 fits onto a front head housing portion 65 which is also part of the housing subassembly 28 (FIG. 3). The back plate 64 and the front head housing portion 65 together form the head housing 63. Also mounted to the back plate 64 are the signal processing electronics, i.e., a control circuit 54 for determining the data 22, and the means 56 for transmitting the data 22.

In one embodiment, the means 50 for moving the light-generating subassembly relative to the submerged surface is a rotary actuator, e.g., an electric motor. The control circuit 54 coordinates acquisition of distance measurements and fixed positioning of the head portion 60 by rotation of the rotary actuator 50. The control circuit 54 communicates with the optical sensor 42, the rotary actuator 50 and, through a waterproof connector 74, the means 57 for generating the three-dimensional point clouds of data (i.e., an external computing system).

As can also be seen in FIG. 3, the laser source 38 is held on the back 64 plate by a clamp 66 which can be tightened or loosened by one or more fasteners 68, e.g., set screws. The direction in which the laser 38 directs the laser light relative to the mirror 40 is adjustable by tightening or loosening the set screws, as required. It will be understood that, absent unusual circumstances, the position of the laser source 38 is only adjusted once, i.e., during initial calibration, and before the assembly 20 is released for operation.

Preferably, once the position of the laser 38 has been adjusted using the fasteners 68, a laser beam configured into the fan configuration 41 is directed through the window element 34A substantially orthogonally to the window element 34A, when the front head housing portion 65 is attached to the back plate 64. In addition, it is preferred that the optical sensor 42 is, when mounted on the back plate 64 and when the front head housing portion 65 is connected with the back plate 65, positioned substantially orthogonally to the window element 34B.

Figure 6A:
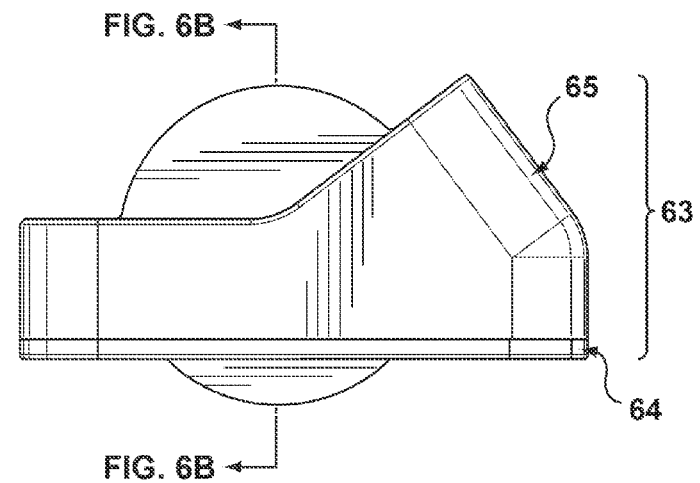
FIG. 6A is an end view of the laser scanner assembly of FIG. 1.
Figure 6B:
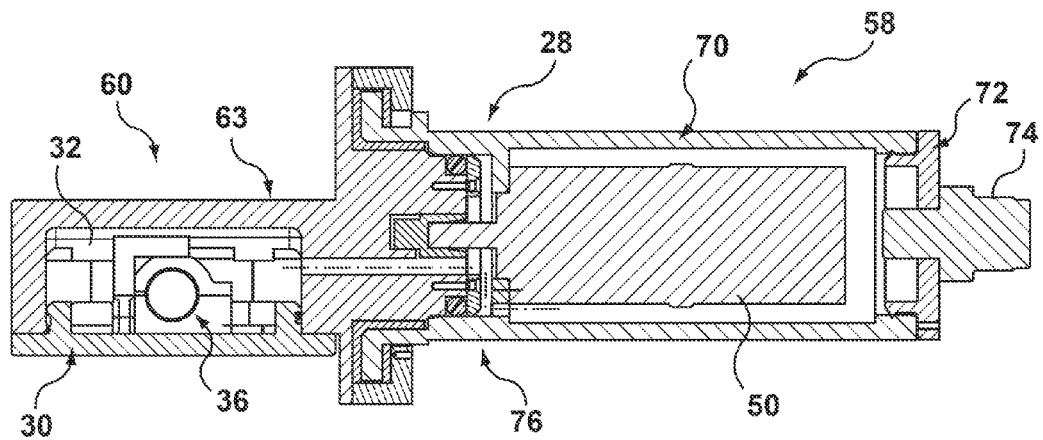
FIG. 6B is a cross-section of the laser scanner assembly of FIG. 1, drawn at a smaller scale.

As can be seen in FIGS. 5-6B, the body portion 58 includes a rotary actuator housing 70, an end cap 72 at an end thereof, and the waterproof connector 74 for connection with a suitable cable (not shown) for communication and power supply. Preferably, the rotary actuator housing 70 is attachable to the underwater vehicle by any suitable means (not shown), as is known in the art. The head portion (i.e., the head housing 63) is rotatable relative to the body portion. The actuator housing 70 and the head housing 63 are attached to each other by respective elements thereof which cooperate to form a concentric alignment and sealing arrangement 76.

Figure 7:
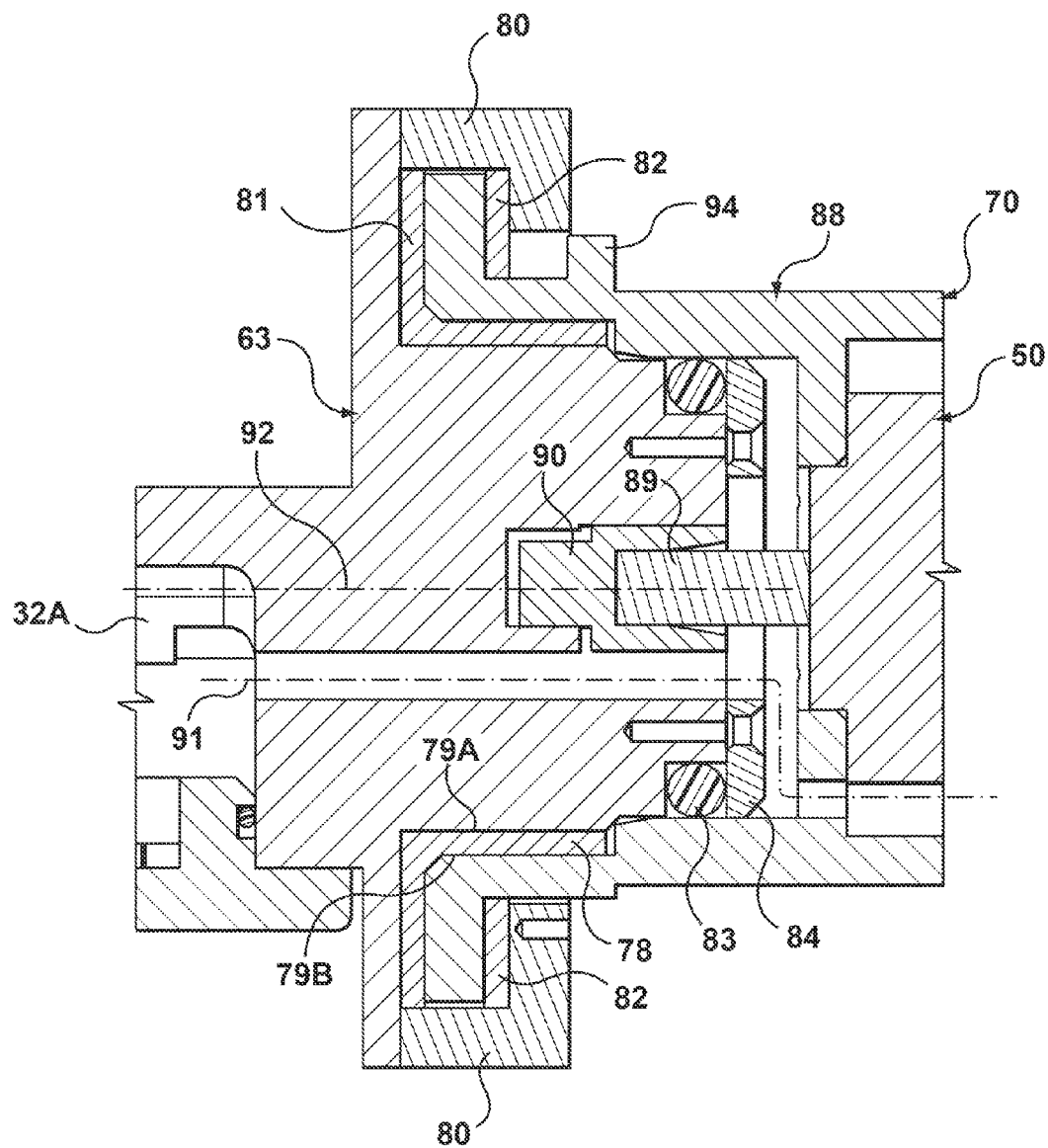
FIG. 7 is a cross-section of a portion of the laser scanner assembly of FIG. 6B, drawn at a larger scale.

As shown in FIG. 7, a flanged polymer sleeve bushing 78 provides surfaces (e.g., 79A, 79B) for the housings 63, 70 to slide against while maintaining the housings 63, 70 in alignment with each other. A connection collar 80 FIGS. 7, 9) is attached to the head housing 63 and prevents relative axial motion between the housings 70, 63. The connection collar 80 holds a flange 81 of the flanged sleeve bushing 78 therein. Also, the connection collar 80 clamps a polymer thrust bushing 82 between the collar 80 and the rotary actuator housing 70, further preventing axial movement of the housings 70, 63 relative to each other. A dynamic seal 83 is located in a seal gland of the head housing 63 and secured in place by the seal end cap 84. The dynamic seal 83 is formed to allow water to flow past the sleeve bushing 78 and the thrust bushing 82 for lubrication and prevents water from entering the cavity 32A in the head housing 63.

The rotary actuator 50 is mounted in the rotary actuator housing 70. The rotary actuator 50 is adapted to provide an unbalanced torque when activated, which results in rotary movement of the head housing 63 relative to the rotary actuator housing 70. As shown in FIG. 7, a stationary part of the rotary actuator 50 is attached to an internal flange 88 of the rotary actuator housing 70, and a spindle 89 (driven to rotate when the rotary actuator is activated) is coupled to the head housing 63 by a keyed insert 90. The keyed insert 90 is affixed to the spindle 89 and transfers torque applied by the rotary actuator 50 to the head housing 63, causing the head portion to rotate about an axis of rotation 92 (FIG. 7).

Figure 8:
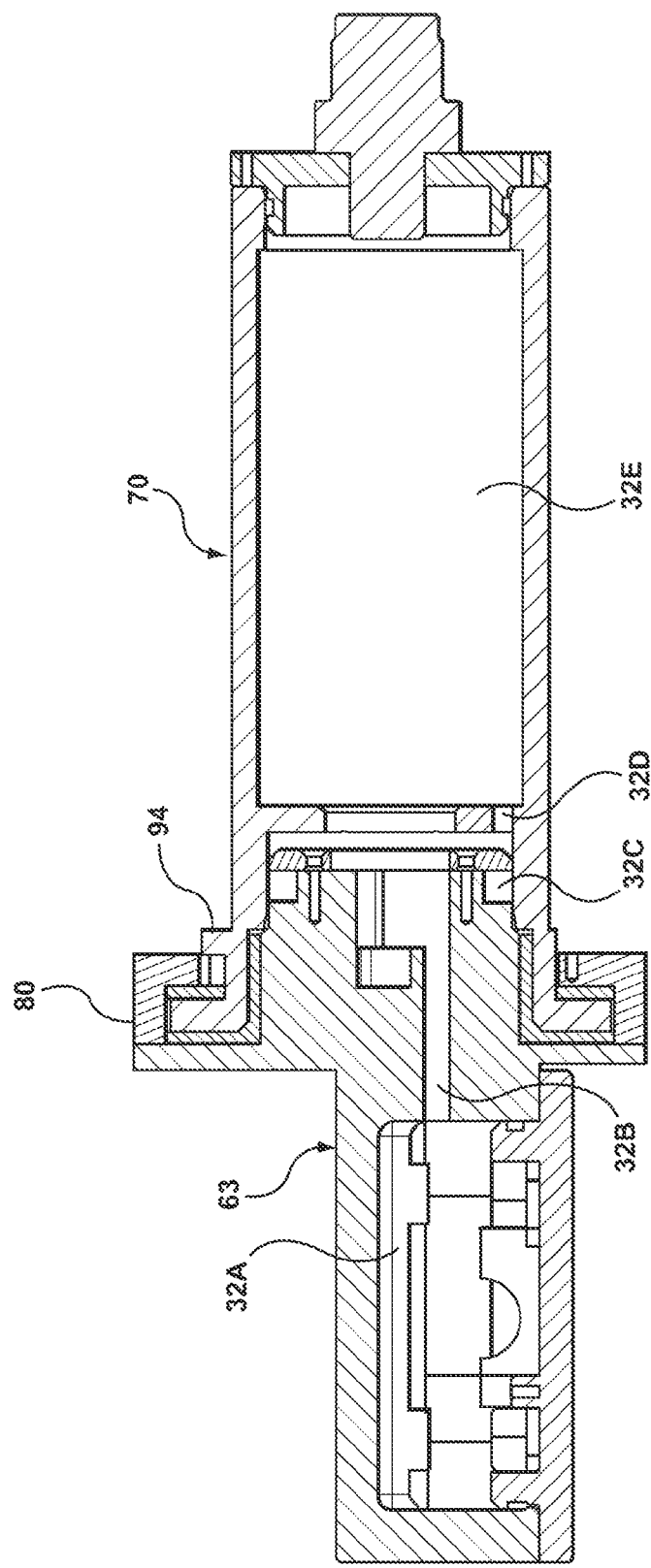
FIG. 8 is a cross-section of the laser scanner assembly of FIG. 1, drawn at a smaller scale.

As can be seen in FIG. 8, the head housing 63 and the rotary actuator housing 70 include a number of interconnected cavities 32A-32E. Wires and cables (not shown) connecting the head portion and the body portion pass through the cavities, carrying electricity or signals (e.g., the data). A path 91 for wires and cables extending between housings 63 and 70 is indicated by a dashed line in FIG. 7. The housing duct 32B and the flange duct 32D are semi-circular slots, coaxial with the axis of rotation 92.

Figure 9:
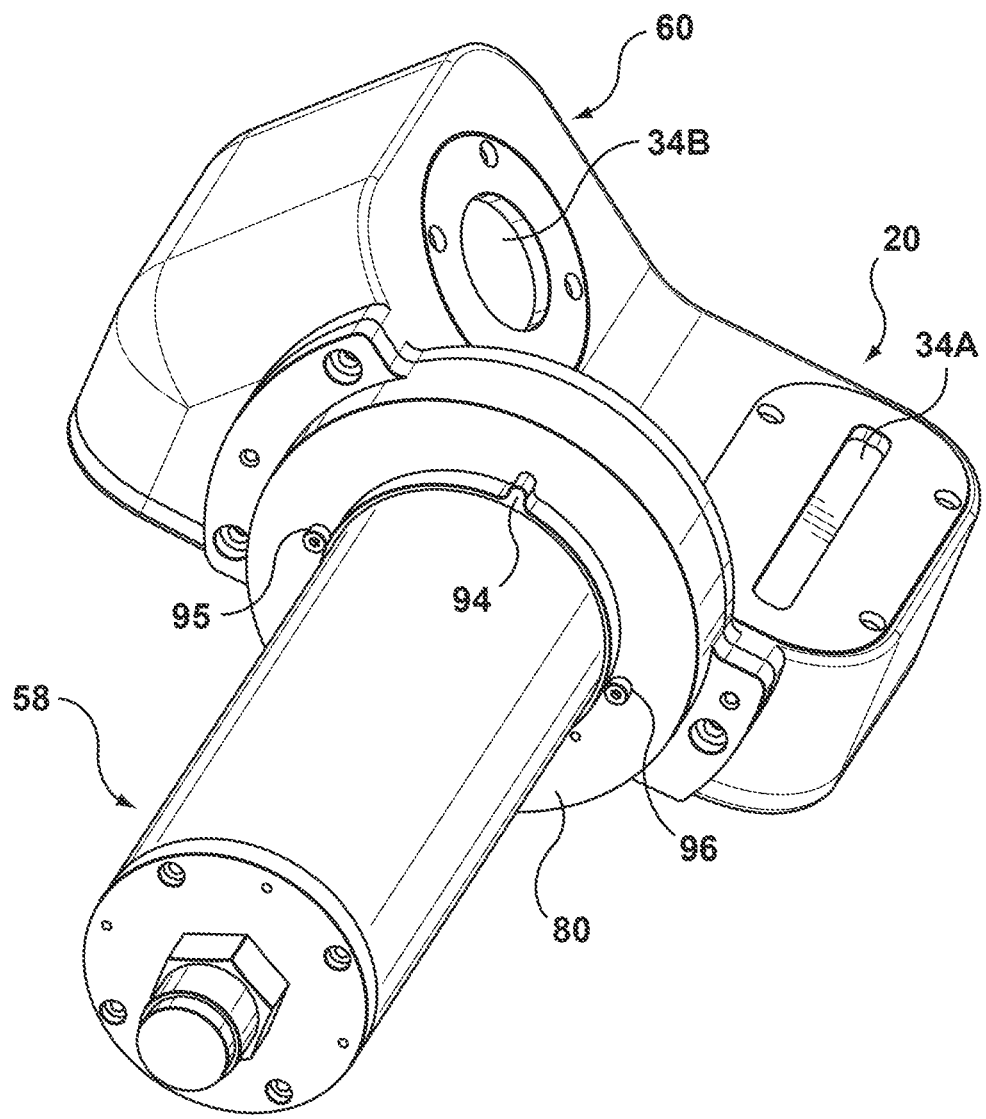
FIG. 9 is another isometric view of the laser scanner assembly of the invention, drawn at a larger scale.

The rotation of the connection collar 80 is limited by a stop element 94 which is included in the rotary actuator housing 70 (FIGS. 7-9). Preferably, and as can be seen in FIG. 9, the laser scanner assembly 20 also includes limit points 95, 96. The limit points 95, 96 preferably are bolts or screws with heads protruding therefrom, for engagement with the hard stop 94, to prevent rotation of the head portion 60 relative to the body portion 58 past certain points The stop element 94 limits the rotation of the head housing 63 relative to the rotary actuator housing 70. Accordingly, the head housing 63 is not permitted to rotate 360° about the axis of rotation 92. However, this simplifies the construction (and therefore results in lower costs), as it permits cables and wires to be used which extend between the head housing and the body portion, i.e., instead of a slip ring construction which would permit full rotation, but involve additional complexity in the structure.

In operation, the rotary actuator 50 holds the head housing 63 in a known orientation relative to the rotary actuator housing 70, and this angle is used in the on-board distance calculations. Once the optical sensor 42 has captured the laser light reflected from a particular point 48, the rotary actuator 50 receives signals from the control circuit 54 to rotate the head housing 63 to the next orientation. As the head housing 63 is rotating, the control circuit 54 calculates the distance to the surrounding environment based on the previously captured data from the optical sensor 42 and send the results of these calculations through the waterproof connection 63 to the means 57 for generating the three-dimensional point cloud of data.

It is preferred that, shortly after the data defining the submerged surface are calculated by the control circuit 54, such data are transmitted to the means 57 for generating the three-dimensional point clouds of data (i.e., the external computing system).

As can be seen in FIG. 17, in another embodiment, the invention includes an underwater vehicle assembly 198 including the underwater vehicle 62 with the laser scanner assembly 20 mounted thereon. The underwater vehicle assembly 198 additionally includes a means for determining the underwater vehicle's location relative to a selected frame of reference. For example, the underwater vehicle's location may be determined using an acoustic positioning system, as is known in the art. Alternatively, the underwater vehicle's location may be determined with reference to known features.

It will be understood that the references herein to "underwater" are not intended to be limiting. Those skilled in the art will appreciate that the laser scanner assembly of the invention may be used in substantially translucent fluids other than water, e.g., air, and the submerged surface may be submerged in any such fluid.

In another embodiment, a laser scanner system 21 of the invention preferably includes the laser scanner assembly 20 of the invention and the means for generating three-dimensional point clouds of data 57 (FIG. 10B).

An alternative embodiment of the laser scanner assembly 220 of the invention is disclosed in FIGS. 11-16B. In the laser scanner assembly 220, a light-generating subassembly 236 is at least partially movable relative to one or more optical sensors 242. Preferably, the laser scanner assembly 220 includes two optical sensors 242. As can be seen in FIGS. 12A-12C, the light-generating subassembly 236 preferably is positioned between two optical sensors, identified for convenience in FIGS. 12A-12C as 242A and 242B. For illustrative purposes, the light-generating means 236 is shown in FIGS. 12A-12C as moving progressively in a clockwise direction (i.e., in the direction indicated by arrow "B") relative to a submerged surface 224.

Figure 14:
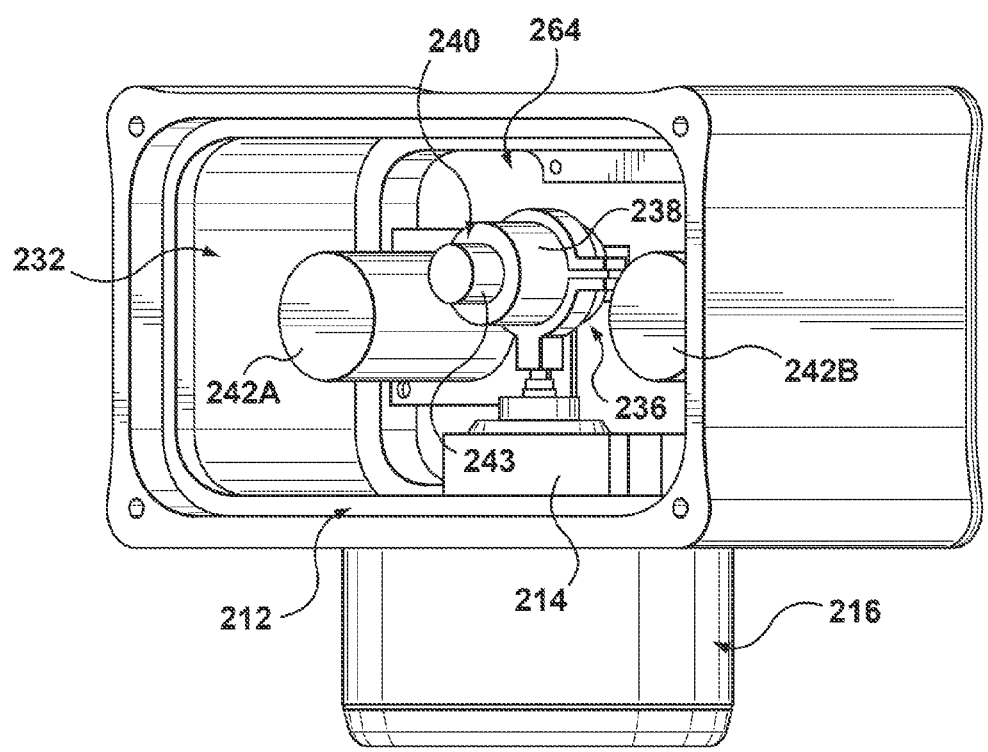
FIG. 14 is an isometric view of the laser scanner assembly of FIG. 11 with a window element thereof removed, drawn at a larger scale.
Figure 15A:
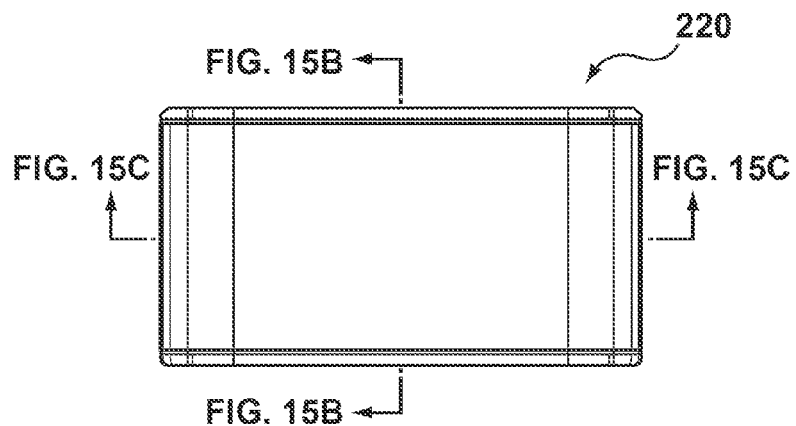
FIG. 15A is a top view of the laser scanner assembly of FIG. 11, drawn at a smaller scale.
Figure 15B:
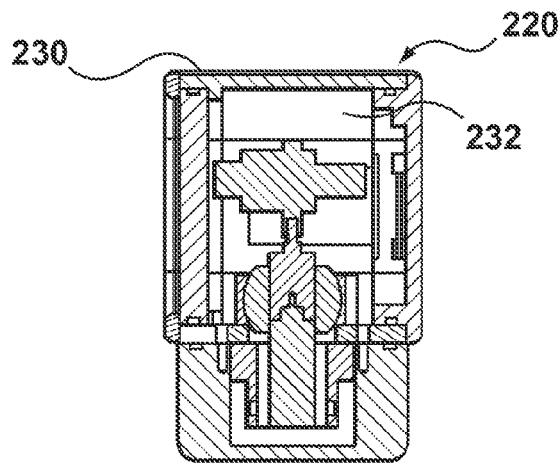
FIG. 15B is a cross-section of the laser scanner assembly of FIG. 15A.
Figure 15C:
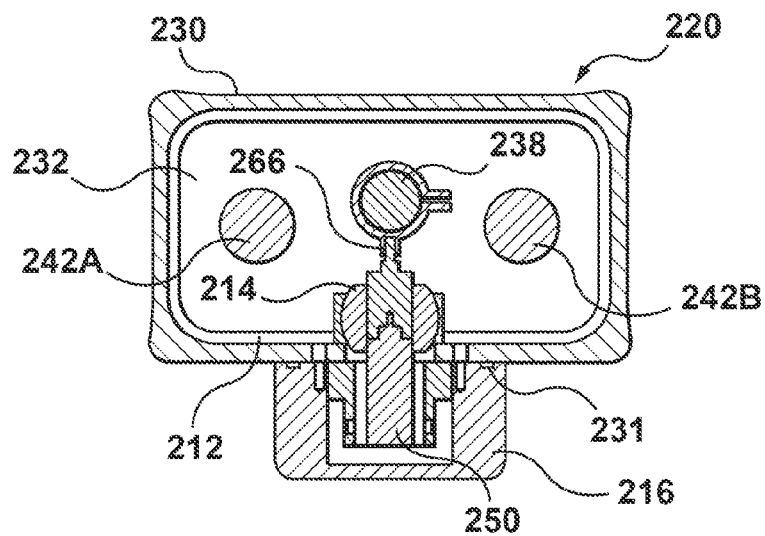
FIG. 15C is a longitudinal cross-section of the laser scanner assembly of FIG. 15A.

The light-generating subassembly 236 includes a laser source 238 and means 240 for configuring the laser light into the fan configuration. In this embodiment of the laser scanner assembly 220, the means 240 consists of only a lens 243, i.e., due to the position of the laser source 238 relative to the optical sensors 242A and 242B, the means 240 does not include a mirror (FIGS. 12C, 14). The fan configuration 241 generated by the light-generating subassembly 236 accordingly is moved relative to the submerged surface 224 and also relative to the optical sensors 242A and 242B when the light-generating subassembly 236 is moved, as will be described.

Figure 12A:
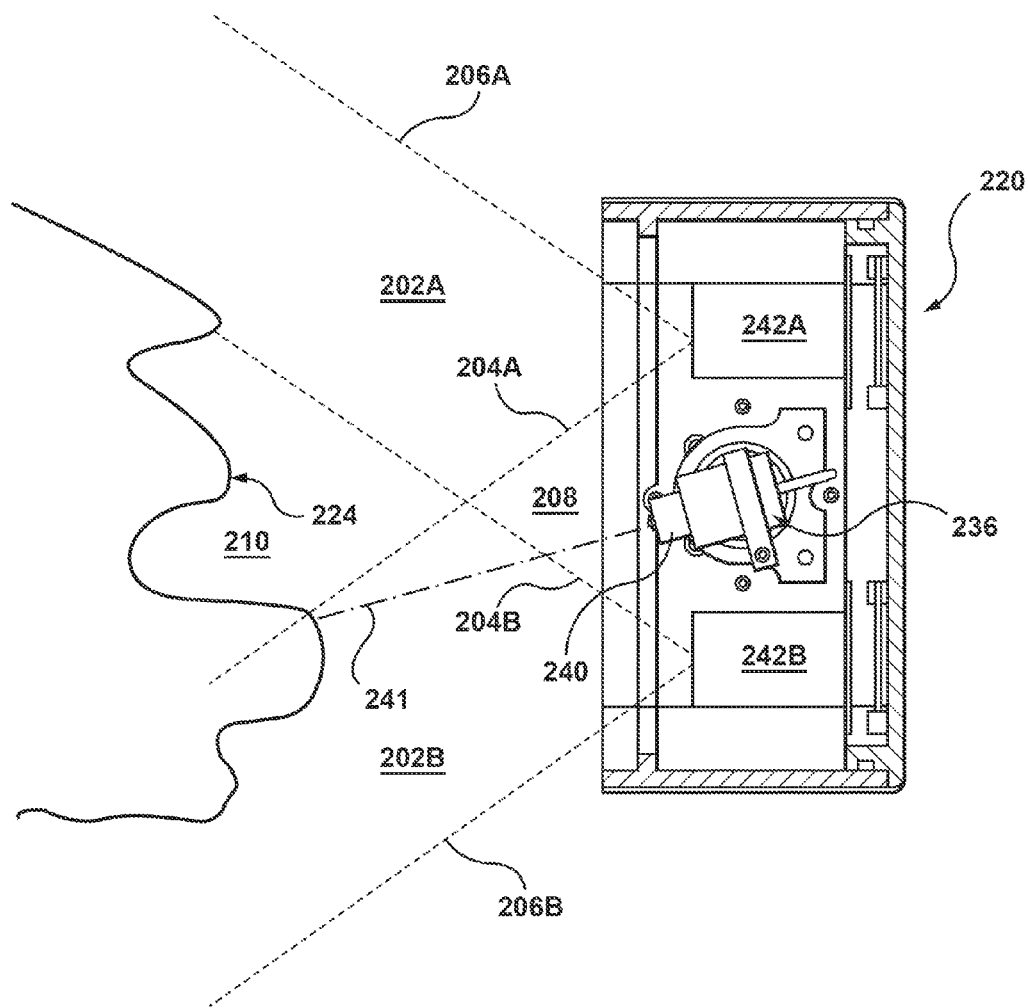
FIG. 12A is a schematic diagram representing the laser scanner assembly of FIG. 11 in position relative to a submerged surface, drawn at a smaller scale.
Figure 12B:
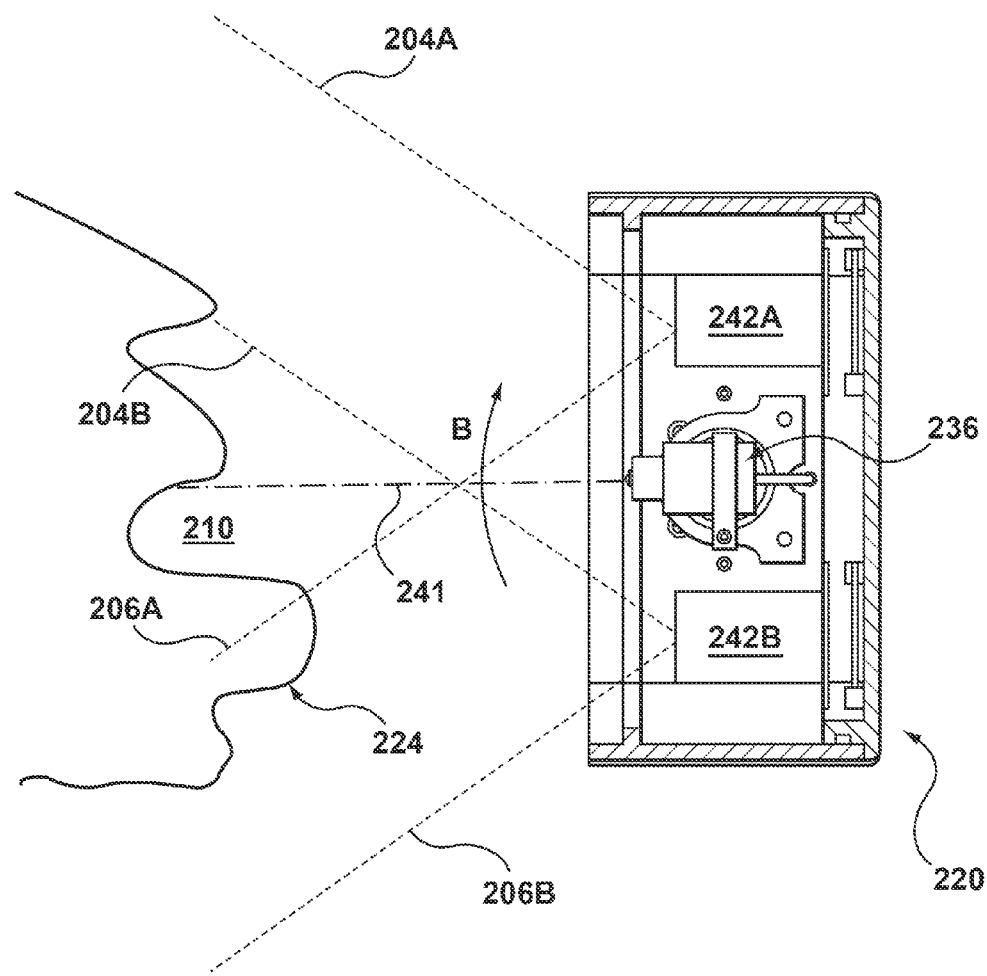
FIG. 12B is a schematic diagram representing the laser scanner assembly of FIG. 11 in position relative to a submerged surface.
Figure 12C:
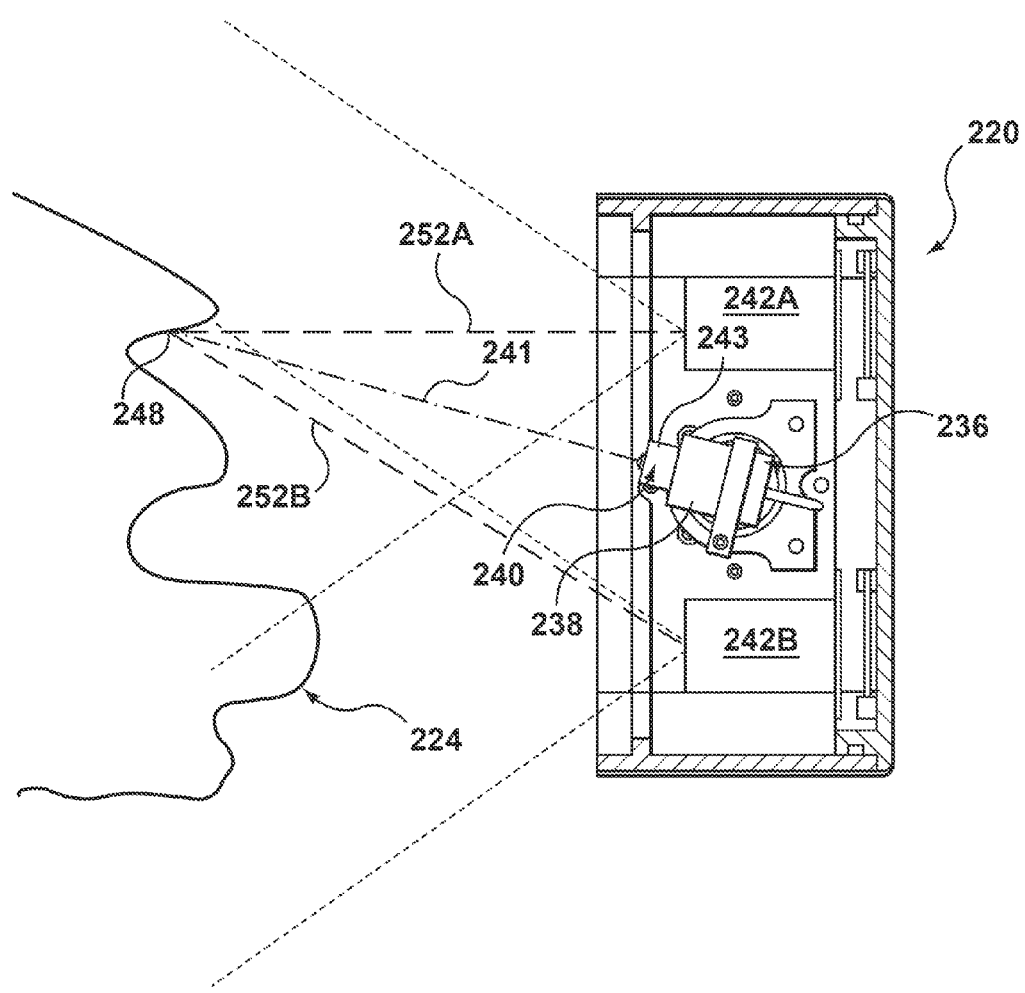
FIG. 12C is a schematic diagram representing the laser scanner assembly of FIG. 11 in position relative to a submerged surface.

As shown in FIGS. 12A-12C, the optical sensors 242A and 242B have fields of view generally identified as 202A and 202B respectively. The field of view 202A is defined by an inner field of view extremity 204A and an outer field of view extremity 206A, and the field of view 202B is defined by an inner field of view extremity 204B and an outer field of view extremity 206B. The angular range of the light-generating subassembly 236 (i.e., the angular magnitude of an arc through which the laser source is rotated during the operation of the laser scanner assembly 220) is defined by the outer extremities 206A, 206B. In addition, as shown in FIG. 12A, the inner extremities 204A and 204B define a gap 208 therebetween. The gap 208 further defines the field of view of the laser scanner assembly 220.

From the foregoing, it can be seen that, because two optical sensors 242A, 242B are included in the laser scanner assembly 220, the field of view of the laser scanner assembly 220 is wider than it otherwise would have been if only one optical sensor had been included therein. Also, to the extent that the fields of view of the optical sensors 242A, 242B overlap, the accuracy of the measurements acquired by the scanner 220 in the region of such overlap 210. A situation in which measurements are obtained in the region of overlap 210 is shown in FIGS. 12B and 12C.

The increased accuracy of measurements acquired in the overlap region 210 results from the illumination of certain pixels on one CCD chip (not shown) of one of the optical sensors (e.g., 242A) that differ from those illuminated on a CCD chip of the other optical sensor (e.g., 242B). As the horizontal distance between the dual optical sensors increases, the distance between the pixels illuminated on each optical sensor's CCD chip, if the images produced by both were superimposed on the other, would also increase. This produces two measurements which, in theory, should match. To the extent that the measurements are not exactly the same, the difference is reconciled using a variety of statistical methods which are known, as would be appreciated by those skilled in the art.

Depending on the required accuracy, it may be that the use of both optical sensors 242A, 242B when the measurements are obtained in the region of overlap 210 is not required. In that situation, only one of the optical sensors 242A, 242B is activated while the measurements are obtained in the region 210. If the fan configuration 241 is directed toward the optical sensor 242A, then only that optical sensor is activated, and vice versa. Preferably, a precedent is preset, so that, if the fan configuration 241 is directed exactly normal to a window element 234, then the preselected optical sensor is activated.

Figure 13:
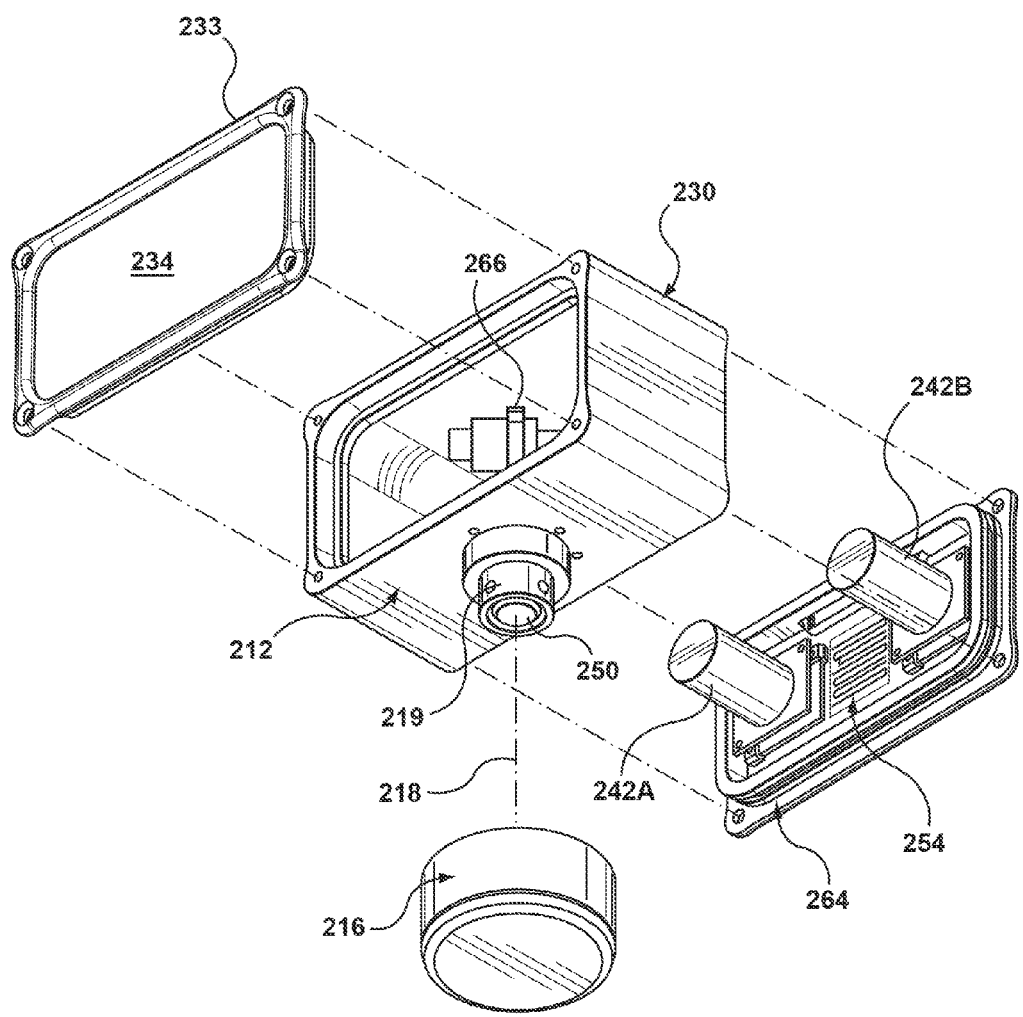
FIG. 13 is an exploded isometric view of the laser scanner assembly of FIG. 11, drawn at a larger scale.

As can be seen in FIGS. 11, 13, and 14-16B, the laser scanner assembly 220 preferably includes a housing subassembly 228 having a body element 230 defining one or more cavities 232 therein. The housing subassembly 228 includes a back plate 264 which fits onto the body element 230 to at least partially define the cavity 232. Preferably, the optical sensors 242A and control circuitry 254 are mounted on the back plate 264 (FIG. 13). The window element 234 is mounted on the body element 230 opposite to the back plate 264.

The body element 230 includes a base portion 212 on which the light-generating subassembly 236 is mounted. A ball joint 214 is affixed to the base portion 212, so that the ball joint 214 is positioned in the cavity 232. To the ball joint 214 a rotary actuator 250 is inserted to a height above the base portion 212 (i.e., extending into the cavity 232) sufficient to provide clearance between the rotary actuator 250 and a rotary actuator housing 216 (FIG. 13). To the shaft of the rotary actuator a clamp 266 is press fit or otherwise secured, to position the laser source 238 therein so that the fan configuration 241 is parallel to an axis of rotation 218 of the clamp 266 about the rotary actuator 250. Ideally, the rotary actuator 250 is positioned in the rotary actuator housing 216 so that the axes thereof are aligned with the axis of rotation 218. Preferably, the laser scanner assembly 220 includes a set screw stand 219 (FIG. 13) including set screws which permit adjustment of the position of the rotary actuator 250 in the rotary actuator housing 216. It will be understood that, absent unusual circumstances, adjustment of the position of the rotary actuator 250 using the set screws is only required once, i.e., during initial calibration, and before the assembly 220 is released for operation.

An o-ring 231 (FIG. 15C) preferably provides for a watertight seal between the body element 230 and the rotary actuator housing 216. It will be appreciated by those skilled in the art that the laser scanner assembly 220 preferably also includes other o-rings and seals. For example, appropriate seals are located between the body element 230 and the window element frame 233 (FIG. 13), and also between the body element 230 and the back plate 264, so that the laser scanner assembly is watertight, i.e., the cavity 232 is kept watertight. Preferably, the laser scanner assembly 220 is substantially neutrally buoyant.

From the foregoing, it can be seen that the laser scanner assembly 220 has the advantage that it does not include externally moving components or dynamic seals. The window element 234 may be made of any suitable clear or translucent material. In operation, because the surface area of the window element 234 of the laser scanner assembly 220 is larger than the surface areas of the window elements 34A, 34B in the laser scanner assembly 20, it is preferred that the laser scanner assembly 20 is used where the pressures to which the unit is subjected are greater.

Figure 16A:
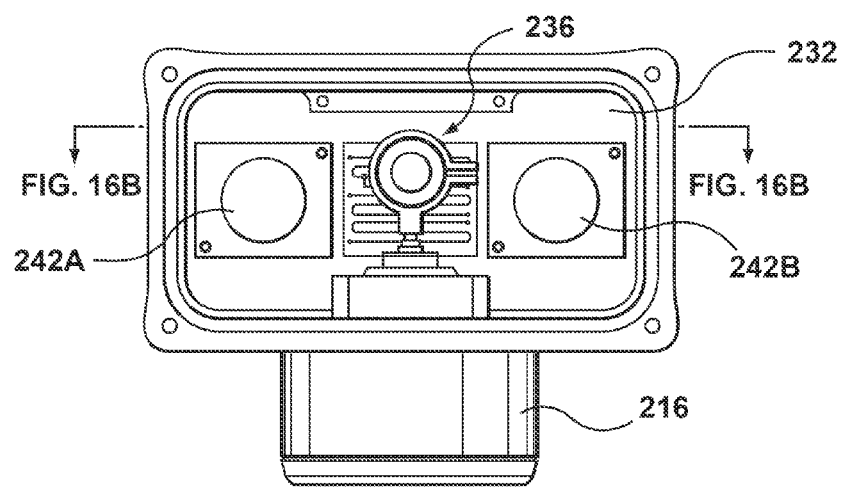
FIG. 16A is a front view of a portion of the laser scanner assembly of FIG. 12, drawn at a larger scale.
Figure 16B:
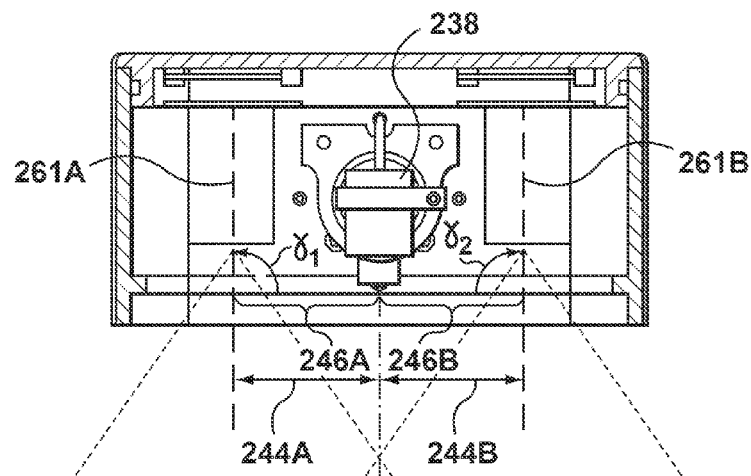
FIG. 16B is a top view of the laser scanner assembly of FIG. 16A.

Calibration of the laser scanner assembly 220 is only required to be done once, i.e., when the assembly 220 is manufactured, and such calibration preferably is done at the manufacturing facility. The positions of the principal directions 261A, 261B of the optical sensors 242A, 242B are determined relative to the baselines 246A, 246B (i.e., $\gamma_1$ and $\gamma_2$ respectively) (FIG. 16B). It will be understood that the baselines 246A and 246B preferably are substantially aligned. Also, the light-generating subassembly 236 is calibrated using a known angle between the fan configuration 241 and the baselines 246A, 246B.

The operation of the laser scanner assembly 220 is generally similar to the operation of the laser scanner assembly 20 described above. For example, in FIG. 12C, a point 248 is illuminated by the laser light fan configuration 241. Reflected paths 252A and 252B result. For each reflected path 252A, 252B, a $\beta$ is determined, i.e., the angle defined between the reflected path and the baseline, the baseline being 246A or 246B, as the case may be. In each case, the measurement of the position of the point 248 is determined using the angle between the fan configuration and the baselines (i.e., θ), the angle between the reflected path and the appropriate baseline (i.e., β), and the relevant baseline distance (i.e., 244A or 244B). As described above, if greater accuracy is desired, then the measurements obtained at both optical sensors 242A, 242B are compared and, using statistical methods, a more accurate measurement is obtained, based on the two measurements obtained at the two optical sensors 242A, 242B respectively.

Data (i.e., the measurements determined using triangulation for many points) preferably is transmitted to a means for generating three-dimensional point clouds of data 57, i.e., a suitable computer system. The data may be transmitted in any suitable manner, as will be known by those skilled in the art. Those skilled in the art will also appreciate that the laser scanner system of the invention may include the laser scanner assembly 220 of the invention and the means for generating three-dimensional clouds of data 57. The laser scanner assembly 220 preferably is mounted on an underwater vehicle using any suitable means, as would be known to those skilled in the art.

It will also be appreciated by those skilled in the art that the invention can take many forms, and that such forms are within the scope of the invention as described above. The foregoing descriptions are exemplary, and their scope should not be limited to the preferred versions provided herein.

We claim:

1. A laser scanner assembly for obtaining data to generate at least one three-dimensional cloud of data describing at least one submerged surface, the laser scanner assembly comprising:
   a housing subassembly comprising at least one body element defining at least one cavity therein and comprising at least one window element therein at least partially defining said at least one cavity;
   a light-generating subassembly positioned in said at least one cavity comprising:
      a laser source for generating laser light;
      means for configuring the laser light into a fan configuration;
   at least one optical sensor positioned in said at least one cavity;
   the means for configuring the laser light into the fan configuration and said at least one optical sensor being spaced apart by a predetermined baseline distance defining a substantially straight baseline therebetween;
   the laser light fan configuration being transmittable through said at least one window element toward said at least one submerged surface, to illuminate a plurality of selected points thereon successively;
   means for moving the light-generating subassembly relative to said at least one submerged surface, for illuminating the illuminated points on said at least one submerged surface respectively;
   the laser light fan configuration being directed through said at least one window element to each said illuminated point respectively at a first angle relative to the baseline for each said illuminated point respectively;
   each said illuminated point being respectively detectable through said at least one window element by said at least one optical sensor, each said illuminated point and said at least one optical sensor defining a reflection path therebetween respectively, the reflection path and the baseline defining a second angle therebetween for each said illuminated point respectively; and
   means for determining the data for locating each said illuminated point respectively utilizable for generating said at least one three-dimensional cloud of data by using the baseline distance and the first and second angles for each said illuminated point respectively.

2. A laser scanner assembly according to claim 1 additionally comprising means for transmitting the data to means for generating said at least one three-dimensional cloud of data.

3. A laser scanner assembly according to claim 1 comprising a laser window element through which the laser light fan configuration is transmitted to the illuminated points respectively and an optical sensor window element through which said at least one optical sensor detects the illuminated points respectively.

4. A laser scanner assembly according to claim 1 in which the housing subassembly comprises:
   a body portion;
   a head portion mounted to the body portion, the head portion being movable relative to the body portion; and
   said means for moving the light-generating subassembly comprising means for moving the head portion relative to the body portion.

5. A laser scanner assembly according to claim 4 in which the light-generating subassembly and said at least one optical sensor are mounted in the head portion and movement of the head portion relative to the body portion results in movement of the light-generating subassembly and said at least one optical sensor relative to said at least one submerged surface.

6. A laser scanner assembly according to claim 1 in which the light-generating subassembly is at least partially movable relative to said at least one optical sensor.

7. A laser scanner assembly according to claim 6 comprising two optical sensors.

8. A laser scanner assembly according to claim 6 which is substantially neutrally buoyant.

9. An underwater vehicle assembly comprising:
   an underwater vehicle;
   means for determining the underwater vehicle's location relative to a selected frame of reference; and
   the laser scanner assembly of claim 1 mounted on the underwater vehicle.

10. A laser scanner system for providing at least one three-dimensional cloud of data describing at least one submerged surface, the system comprising:
   at least one laser scanner assembly comprising:
      a housing subassembly comprising at least one body element defining at least one cavity therein and comprising at least one window element therein at least partially defining said at least one cavity;
      a light-generating subassembly positioned in said at least one cavity comprising:
         a laser source for generating laser light;
         means for configuring the laser light into a fan configuration;
      at least one optical sensor positioned in said at least one cavity;
      the means for configuring the laser light into the fan configuration and said at least one optical sensor being spaced apart by a predetermined baseline distance defining a substantially straight baseline therebetween;
      the laser light fan configuration being transmittable through said at least one window element toward said at least one submerged surface, to illuminate a plurality of selected points thereon successively;
      means for moving the light-generating assembly relative to said at least one submerged surface, for illuminating the illuminated points on said at least one submerged surface respectively;

the laser light fan configuration being directed through said at least one window element to each said illuminated point respectively at a first angle relative to the baseline for each said illuminated point respectively;

each said illuminated point being respectively detectable through said at least one window element by said at least one optical sensor, each said illuminated point and said at least one optical sensor defining a reflection path therebetween respectively, the reflection path and the baseline defining a second angle therebetween for each said illuminated point respectively;

means for determining data for locating each said illuminated point respectively utilizable for generating said at least one three-dimensional cloud of data by using the baseline distance and the first and second angles for each said illuminated point respectively;

means for transmitting the data;

means for receiving the transmitted data; and means for utilizing the data to generate said at least one three-dimensional cloud of data describing said at least one submerged surface.

11. A laser scanner system according to claim 10 in which said at least one laser scanner assembly additionally comprises a laser window element through which the laser light fan configuration is transmitted to the illuminated points respectively and an optical sensor window element through which said at least one optical sensor detects the illuminated points respectively.

12. A laser scanner system according to claim 10 in which the housing subassembly of said at least one laser scanner assembly additionally comprises:

a body portion;

a head portion mounted to the body portion, the head portion being movable relative to the body portion; and said means for moving the light-generating subassembly comprising means for moving the head portion relative to the body portion.

13. A laser scanner system according to claim 12 in which the light-generating subassembly and said at least one optical sensor are mounted in the head portion and movement of the head portion relative to the body portion results in movement of the light-generating subassembly and said at least one optical sensor relative to said at least one submerged surface.

14. A laser scanner system according to claim 13 in which the light-generating subassembly is at least partially movable relative to said at least one optical sensor.

15. A laser scanner system according to claim 14 in which said at least one laser scanner assembly comprises two optical sensors.

16. A method of providing at least one three-dimensional cloud of data describing at least one submerged surface, the method comprising:

(a) providing a laser scanner assembly comprising:

a housing subassembly comprising at least one body element defining at least one cavity therein and comprising at least one window element therein at least partially defining said at least one cavity;

a light-generating subassembly positioned in said at least one cavity comprising:

a laser source for generating laser light;

means for configuring the laser light into a fan configuration;

at least one optical sensor positioned in said at least one cavity;

the means for configuring the laser light into the fan configuration and said at least one optical sensor being spaced apart by a predetermined baseline distance defining a substantially straight baseline therebetween;

(b) transmitting the laser light configuration through said at least one window element toward said at least one submerged surface, to illuminate a plurality of selected points thereon successively;

(c) moving the light-generating subassembly relative to said at least one submerged surface, for illuminating the illuminated points on said at least one submerged surface respectively;

(d) directing the laser light fan configuration toward said at least one submerged surface at a first angle relative to the baseline for each said illuminated point respectively;

(e) utilizing said at least one optical sensor to detect each said illuminated point respectively, each said illuminated point and said at least one optical sensor defining a reflection path therebetween, the reflection path and the baseline defining a second angle therebetween for each said illuminated point respectively;

(f) determining data locating each said illuminated point respectively for generating said at least one three-dimensional cloud of data by triangulation using the baseline distance and the first and second angles for each said illuminated point respectively;

(g) transmitting the data to means for generating said at least one three-dimensional cloud of data describing said at least one submerged surface based on the data; and (h) generating said at least one three-dimensional cloud of data describing said at least one submerged surface based on the data.

* * * * *

UNITED STATES PATENT AND TRADEMARK OFFICE
CERTIFICATE OF CORRECTION

PATENT NO.       : 8,542,413 B2
APPLICATION NO.  : 13/202405
DATED            : September 24, 2013
INVENTOR(S)      : Gillham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 217 days.

Signed and Sealed this

Fifteenth Day of September, 2015

Michelle K. Lee
*Director of the United States Patent and Trademark Office*